(12) United States Patent
McCaw et al.

(10) Patent No.: US 7,452,200 B2
(45) Date of Patent: Nov. 18, 2008

(54) BRIQUETTING DIE FOR DISPERSIBLE FIBER BRIQUETTES

(75) Inventors: Mike W. McCaw, Seattle, WA (US); Roman T. Dec, Anniston, AL (US)

(73) Assignee: Weyerhaeuser Company, Federal Way, WA (US)

( * ) Notice: Subject to any disclaimer, the term of this patent is extended or adjusted under 35 U.S.C. 154(b) by 383 days.

(21) Appl. No.: 11/094,915

(22) Filed: Mar. 30, 2005

(65) Prior Publication Data
US 2006/0222728 A1    Oct. 5, 2006

(51) Int. Cl.
*B29C 43/24* (2006.01)
(52) U.S. Cl. .................. 425/237; 425/363; 425/122
(58) Field of Classification Search .......... 425/237, 425/363, 121–122, 362, 367, 375
See application file for complete search history.

(56) References Cited

U.S. PATENT DOCUMENTS

| | | | |
|---|---|---|---|
| 3,300,815 A * | 1/1967 | Rohaus et al. | 425/237 |
| 4,411,611 A * | 10/1983 | Ohtawa et al. | 425/237 |
| 4,798,529 A | 1/1989 | Klinner | |
| 4,824,352 A | 4/1989 | Hadley et al. | |
| 5,017,124 A | 5/1991 | Holley | |
| 5,382,149 A * | 1/1995 | Yates et al. | 425/237 |
| 5,733,587 A * | 3/1998 | Ream et al. | 425/237 |
| 6,009,690 A * | 1/2000 | Rosenberg et al. | 425/363 |
| 6,032,446 A | 3/2000 | Gola et al. | |

\* cited by examiner

*Primary Examiner*—Yogendra Gupta
*Assistant Examiner*—Thu Khanh T Nguyen
(74) *Attorney, Agent, or Firm*—John M. Crawford

(57) ABSTRACT

A briquetting die set comprises first and second mating cylindrical dies. The first die has a plurality of adjacent recesses surrounded by a wall having an upper rim. At least a portion of the upper rim of each recess is common to an adjacent recess and has a relatively small radius of curvature. The second mating die has mirror image recesses thereon. When the first and second dies are brought into mating relationship, the upper rims of the first and second plurality of recesses mate with each other in substantially line contact to form a briquetting cavity.

7 Claims, 4 Drawing Sheets

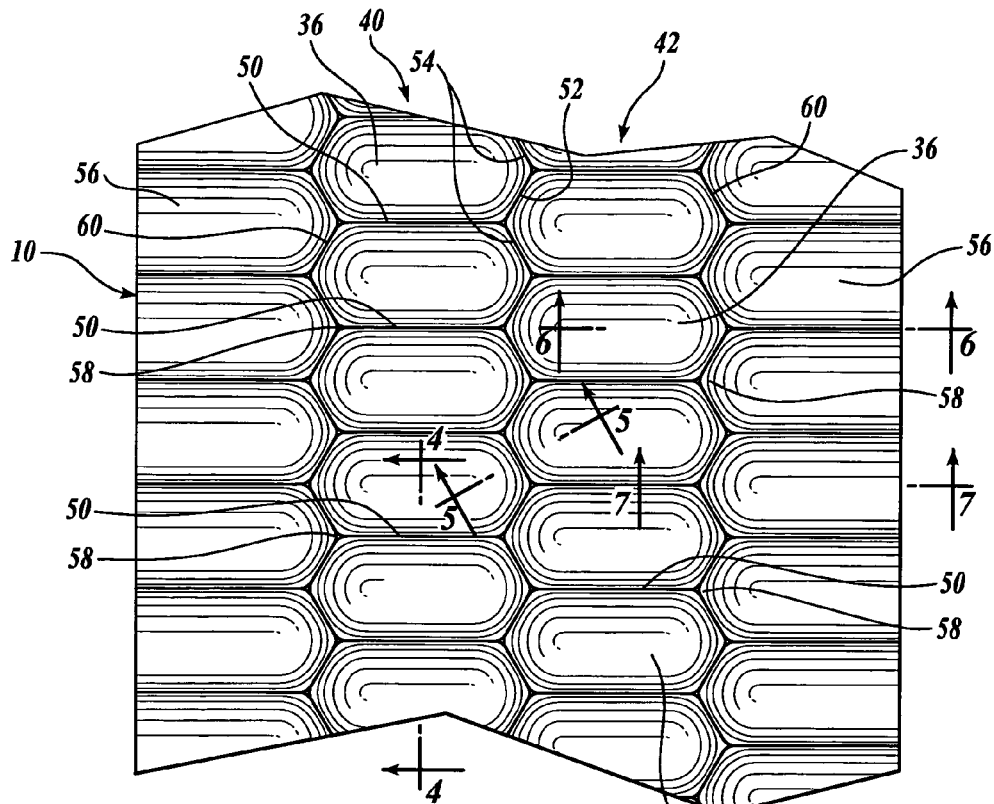
Fig.3.
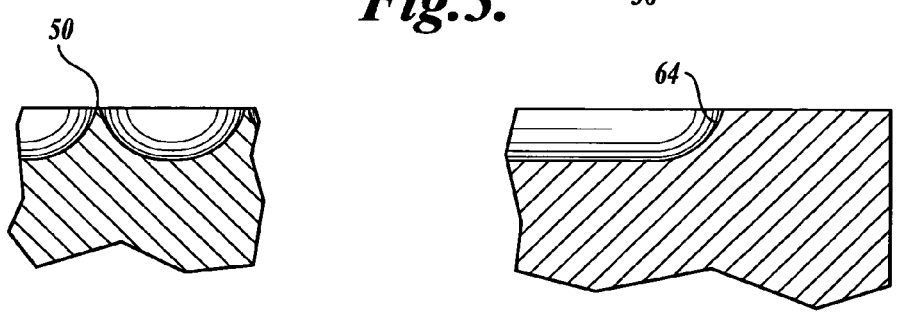
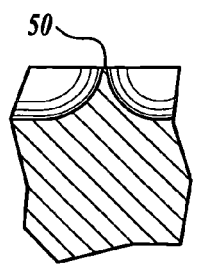
Fig.4.
Fig.6.
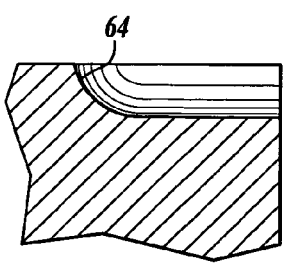
Fig.5.
Fig.7.

BRIQUETTING DIE FOR DISPERSIBLE FIBER BRIQUETTES

FIELD OF THE INVENTION

The present invention relates to the formation of briquettes from fibers, and more particularly, to a high speed briquetting die for forming a plurality of fiber briquettes.

BACKGROUND OF THE INVENTION

Readily dispersible fibers may be utilized in the construction of fiber reinforced materials such as plastic and cementitious panels used in the building trades as a filler and reinforcing medium. For example, the fibers may be dispersed in an aqueous cementitious slurry and then formed into the panels. It is important for the fibers to be readily dispersible into the slurry so that the fibers are separated from one another and distributed evenly throughout the slurry. It is also important that the fibers be provided to the panel manufacturer in a form that is easily transportable, flowable, and meterable.

The fibers may be supplied in the form of small pellets or briquettes. Prior attempts at making briquettes in flat or rotary dies have resulted either in substantial wastage or the formation of webs between individual briquettes that are hard and glassified. These hard glassified webs do not easily dissolve and disperse in the cementitious slurries. A die and method of manufacturing briquettes that eliminates the hard and glassified web between the individual pellets or briquettes is needed.

SUMMARY OF THE INVENTION

The present invention therefor provides a briquetting die set that comprises a first die and a second mating die. Preferably, the first and second dies are cylindrical in shape with die forming recesses formed on the circumferential faces of each of the first and second dies. The first die has a first plurality of adjacent recesses therein. Each of these recesses is surrounded by a wall having an upper rim, at least a portion of which is common to an adjacent recess and that has a relatively small radius of curvature. The second mating die has a second plurality of recesses therein that are formed in the mirror image of the recesses in the first die. Again, each of the second plurality of recesses has an upper rim, at least a portion of which is common to an adjacent recess and has a relatively small radius of curvature. The upper rims of the first and second plurality of recesses mate with each other in a substantially line contact as said first and second dies are rotated and brought into mating relationship.

BRIEF DESCRIPTION OF THE DRAWINGS

The foregoing aspects and many of the attendant advantages of this invention will become more readily appreciated as the same become better understood by reference to the following detailed description when taken conjunction with the accompanying drawings, wherein:

FIG. 3 is an enlarged view of a surface of one of the dies showing the briquette-forming recesses constructed in accordance with the present invention;

FIG. 4 is a cross-sectional view taken along section line 4-4 of FIG. 3;

FIG. 5 is a cross-sectional view taken along section line 5-5 of FIG. 3;

FIG. 6 is a cross-sectional view taken along section line 6-6 of FIG. 3;

FIG. 7 is a cross-sectional view taken along section line 7-7 of FIG. 3;

DETAILED DESCRIPTION OF THE PREFERRED EMBODIMENT

Figure 1:
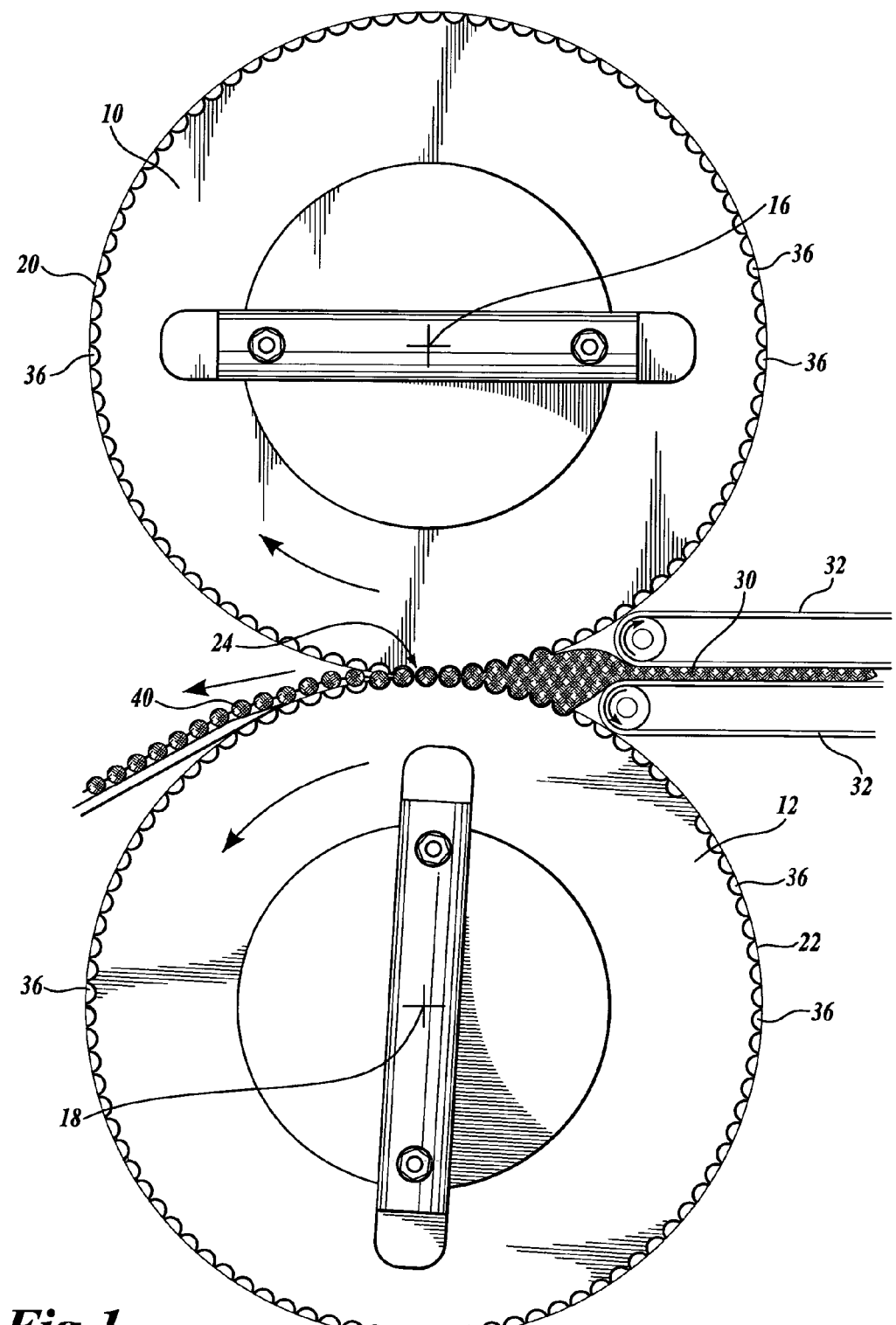
FIG. 1 is a side elevation view of first and second mating dies constructed in accordance with the present invention used to produce briquettes of easily dispersible fiber.
Figure 2:
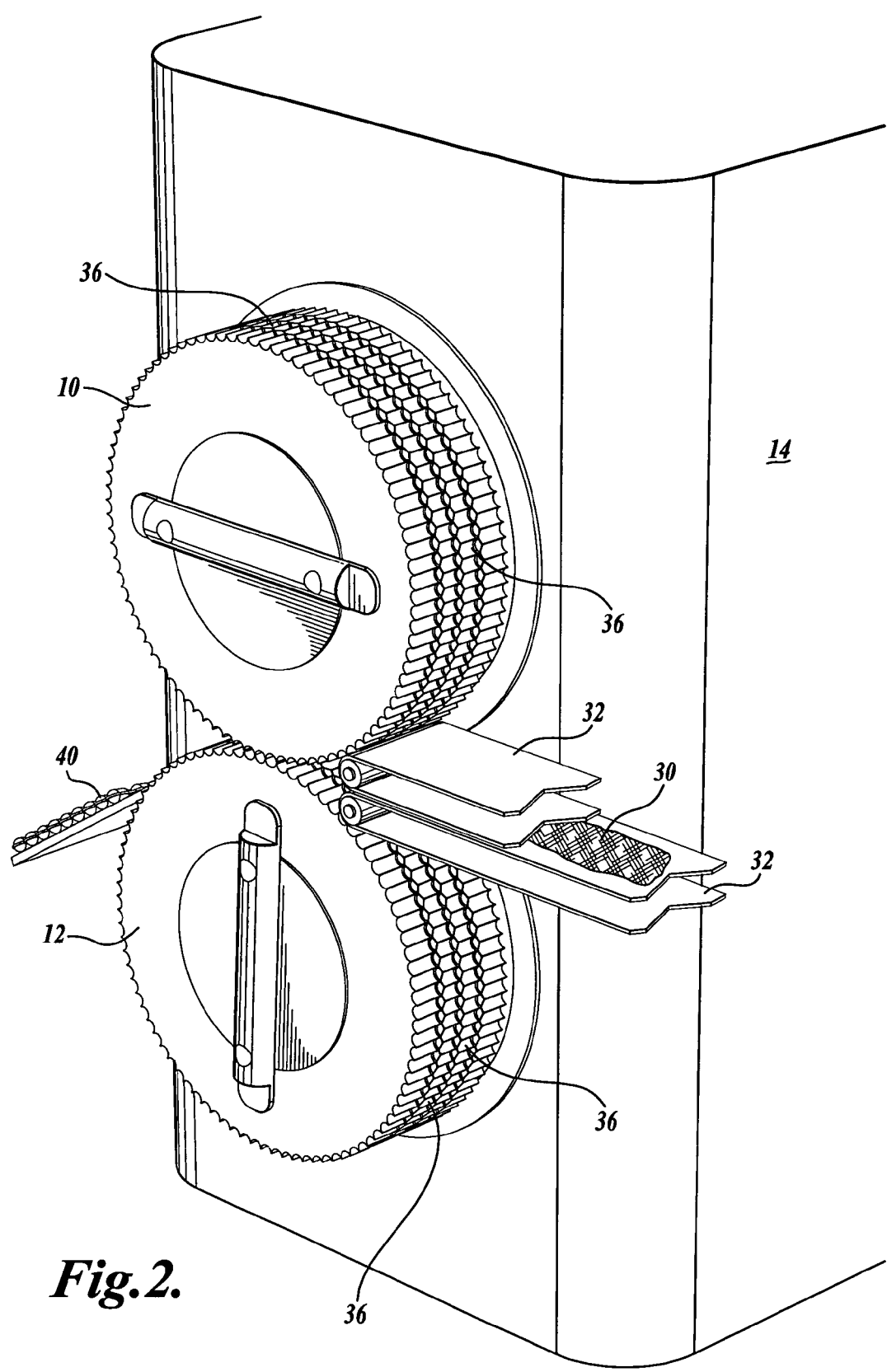
FIG. 2 is an isometric view of the apparatus shown in FIG. 1.

Referring to FIGS. 1 and 2, a first die 10 and a second die 12 are mounted on a support frame generally designated 14. Each of the dies is mounted for rotation about axes 16 and 18, respectively. The dies 10 and 12 are cylindrical and preferably of equal diameter. The axes 16 and 18 are spaced by a distance such that the circumferential surfaces 20 and 22 of dies 10 and 12 mate in substantially tangential relationship at the briquetting location or nip 24 between the two dies. Cellulose fiber 30, preferably in the form of an air laid mat, is fed by opposing conveyors 32 and 34 to the nip 24 between the two dies 10 and 12. Each of the dies contains a plurality of recesses 36 on their respective circumferential faces. The dies are rotated so that a recess on one die mates with a recess on the opposing die to form cavities in the shape of a flattened cylindroid. These cavities receive the cellulose fibers 30 as the dies rotate and form the fibers into briquettes 40.

Referring to FIGS. 2 and 3, the recesses 36 are formed in a circumferential array around each of the dies 10 and 12. The recesses in the second or mating die 12 are the mirror image of the recesses created in the first die 10. Recesses 36 in a preferred embodiment are formed in two rows 42 and 44 around the circumference of the dies. While only two rows are shown, one of ordinary skill will understand that any number of side by side rows may be employed, limited only by the width of the circular die and the constraints in building and operating an apparatus on which the dies are mounted.

The recesses 36 will now be described in more detail only in conjunction with FIG. 3 and the upper die 10. It is to be understood, however, that the dies on the lower die are formed in exactly the same manner and, as stated above, are formed in the mirror image of those on the upper die 10. Each of the recesses 36 in plan view are preferably racetrack shaped. That is, the recesses have elongated, substantially parallel sides with curved end portions that approximate a semicircle. Each of the recesses has an upper rim 50 that lies on the original circumferential surface of the cylindrical die 10. The recesses 36 extend radially inwardly from the upper rims 50. Preferably, the lateral dimension of each racetrack-shaped recess is about twice the circumferential width of the recess along the upper rim. Preferably, each recess has smoothly contoured sides that blend smoothly with each other at the bottom or radially inwardly portion of the recesses 36. It is preferred that the maximum depth of the recess be on the order of 50% or less of its circumferential width, although other depths may be employed as desired. It is preferred that the length of the recesses range from 10 mm to 60 mm, preferably 21 mm, the width of the recesses range from 5 mm to 50 mm, preferably 7 mm, and the depth range from 1 mm to 30 mm, but preferably not greater than 50% of the length. The bottom of the recesses are radiused into the sidewalls. The radius of the rims 50 is preferably 1.0 mm or less. A small radius on the rim causes the fiber to flow laterally (circumferentially and crosswise) so as to minimize the web thickness between briquettes. These dimensions may also vary depending on the end use of the briquette.

The upper rims of the recesses are formed to eliminate any substantial lands or smooth areas at the surface of the circumferential surface of the die so as to eliminate regions in which fiber can be compacted into hard, glassified mats. Thus, each of the lateral portions of the rims in each of the rows 42 and 44 are shared with the next adjacent recess. The recesses of the second row 44 are offset in the circumferential direction by one-half the circumferential width of the recesses so that the curved end portions 52 of one row 42 is nested between the curved end portions 54 of the recesses of the adjacent row 40. In addition, two rows of offset troughs 56 are formed laterally outwardly from each of rows 42 and 44. These troughs 56 have circularly shaped end portions 58 that are circumferentially offset from adjacent recesses in rows 44 and 42, respectively. The troughs 56 open onto opposite sides of the die 10 and are not used to form briquettes. It is necessary for these troughs to be formed, however, so that the curved portions of the rims 50 of the recesses 36 meet the circumferential surface along lines 60.

Figure 8:
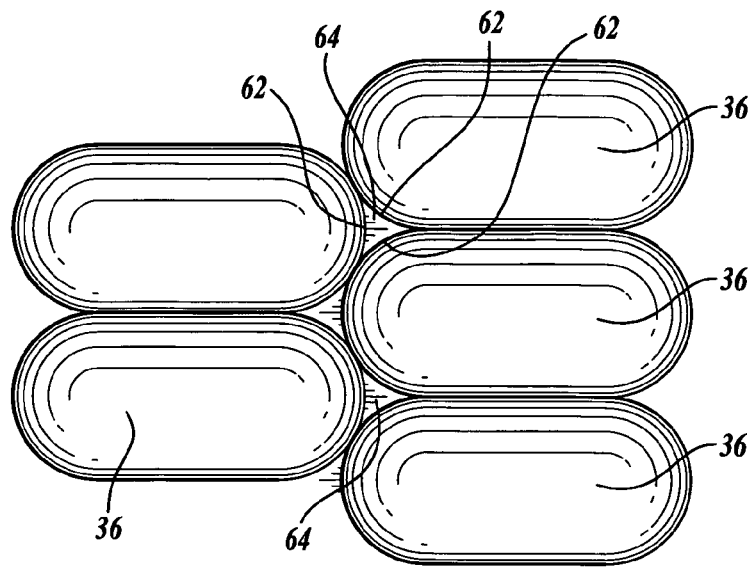
FIG. 8 is a schematic view of the recesses formed in the surfaces of the dies before they are completely machined.

Referring to FIGS. 4 and 5, rims 50 between recesses 36 essentially meet at a line or knife edge, but are preferably rounded to a relatively small radius, as set forth above. Referring now to FIG. 8, the schematic depiction of the recesses 36 are shown before they are completely milled. Recesses 36 are formed by a milling machine having a hemispherical milling tool. This tool, however, leaves large triangularly shaped lands 64 between adjacent rows of recesses 36. If these lands 64 are allowed to remain on the circumferential surface of the die, as fibers are fed through the die, they will be compacted in hard mats at the lands. Thus, the edges 62 of the lands 64 may be hand milled so that the edges recede toward the center point of the lands 64 joining the edges 62 from adjacent recesses as shown in FIG. 3. This milling is preferably accomplished with a computer numerically controlled (cnc) milling machine. This milled surface 64 is shown in the cross sections of FIGS. 6 and 7 taken across the region that was a land prior to being additionally milled to cause the edges 62 of the lands 64 to retreat toward each other and form a virtual line between adjacent curved end portions of recesses 36.

Figure 9:
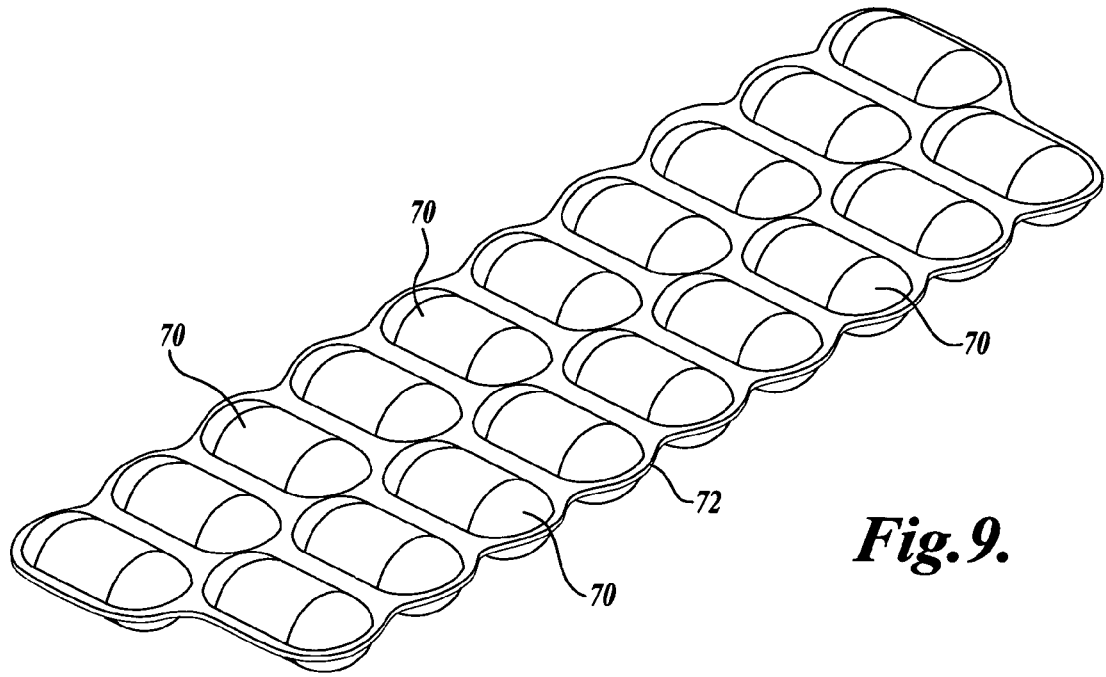
FIG. 9 is a schematic view of a plurality of briquettes manufactured with the briquetting dies of the present invention.

As shown in FIG. 9, the briquettes are in the shape of an oblate or flattened cylindroid. Referring to FIG. 4, the preferred cross-section of one side of a forming recess for this briquette is shown. It will be understood that the briquette formed by this recess has a flattened cross-section in its minor dimension.

Referring now to FIG. 9, a ribbon of briquettes 70 formed in the recesses 36 are shown. The briquettes 70 are compacted, but are readily separated and dispersed when placed in an aqueous slurry. The bands 72 of material between the briquettes are formed in the regions where the upper rims 50 of adjacent recesses meet. The bands are paper thin (although shown as having some thickness) and allow the briquettes to be easily separated from each other without any hard glassified mats of fiber remaining.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A briquetting die set comprising:
    a first die having a first plurality of adjacent recesses therein, each of said recesses being surrounded by a wall having an upper rim, at least a portion of each upper rim being common to an adjacent recess and having a radius of curvature, and
    a second mating die having a second plurality of recesses therein being a mirror image of the recesses in said first die, each of said second plurality of recesses having an upper rim, at least a portion of each upper rim of said second plurality of recesses being common to an adjacent recess and having a radius of curvature, said upper rims of said first and second plurality of recesses mating with each other in substantially line contact as said first and second dies are brought into mating relationship.

2. The apparatus of claim 1, wherein said first and second dies are cylindrical, and wherein said recesses extend radially inwardly from the circumferential surface of each of said dies, said dies being positioned for rotation about respective axes, the upper rims of said respective dies being positioned on said circumferential surfaces of said respective dies and mating with each other as said dies are rotated about their respective axes.

3. The apparatus of claim 1, wherein said recesses are generally racetrack shaped in plan view.

4. The apparatus of claim 3, wherein the recesses are arranged in two circumferential rows around each die, and wherein each recess in said first row is offset laterally by half the width of a recess from the recesses in the second row.

5. The apparatus of claim 4, wherein the sides of said recesses are curved and blend smoothly into each other along the bottom portion of each recess.

6. The apparatus of claim 5, wherein said recesses are elongated across the width of the circumferential surface.

7. The apparatus of claim 1, wherein the radius of curvature is 1.0 mm or less.

\* \* \* \* \*